United States Patent Office 2,823,976
Patented Feb. 18, 1958

2,823,976

RECOVERY OF THORIUM AND URANIUM VALUES FROM AQUEOUS SOLUTIONS

George D. Calkins, Worthington, Ohio, assignor to the United States of America as represented by the United States Atomic Energy Commission No Drawing. Application June 24, 1952
Serial No. 295,363

4 Claims. (Cl. 23—14.5)

The present invention deals with the separation of uranium from a mixture of thorium values and uranium values, a mixture of uranium and rare earth values, and a mixture of uranium values, thorium values and rare earth values. The present invention concerns particularly the separation of uranium values from thorium and rare earth values and more especially with the separation and recovery of uranium values from various ore materials, such as monazite sand, which usually contain substantial amounts, about 60%, of rare earth metal values in addition to considerably lesser amounts of uranium and thorium values. Uranium and thorium are present in monazite sand as orthophosphates in amounts of about 0.3% of $U_3O_8$ and about 6.3% of $ThO_2$; these phosphates are associated, e. g. in the case of a Brazilian monazite sand, with about 3.3% titanium oxide, 2.6% ferric oxide, and about 2.0% silicon dioxide.

It is an object of the instant invention to provide a process for separation of uranium values from the bulk of the rare earth values, thorium values and other metal values.

A further object of this invention is to provide a process for preliminary separation of uranium from rare earths in order to simplify subsequent separation and purification of uranium and/or thorium by known methods, such as solvent extraction or ion exchange.

A further object of this invention is to provide a process for the separation of uranium values from the bulk of the rare earths and thorium values while permitting a substantial reduction in the volume and bulk of the materials treated without sacrificing either the yield or the purity of the product obtained.

A further object of this invention is to provide a process which yields a by-product solution containing thorium values and only part of the rare earth values in a form from which thorium is readily recoverable.

Further objects and advantages in the instant invention will be apparent in the disclosure set forth hereinafter.

Monazite sand is often processed by treating it in comminuted form with a hot concentrated solution of sodium hydroxide whereby the thorium, uranium and rare earth metal values, and also iron, titanium and silicon compounds, precipitate while the remaining solution mainly contains trisodium phosphate and any excess of sodium hydroxide. The precipitate is suspended in water whereby it separates into two fractions, a lighter one which contains the uranium, thorium, rare earths and some phosphorus values, and a heavier one containing the iron, titanium and silicon compounds. Upon separation of the two fractions, the lighter part of the precipitate is then dissolved in nitric or hydrochloric acid. The bulk of the rare earth values is removed from this solution by adding an exess of alkali carbonate to the solution and boiling the mixture; the rare earth values are thereby precipitated, together with part of the thorium present. The solution still contains a considerable amount of thorium, possibly some rare earths and practically all of the uranium present.

It has been found that thorium and rare earth values are readily precipitated from such an aqueous carbonate solution containing uranium, thorium, and rare earth values and the uranium values thus isolated by the addition of hydrogen peroxide preferably in excess of the stoichiometric quantity required for precipitation of said thorium and rare earth values; the uranium values preferentially remain dissolved. The pH value of the carbonate solution is preferably adjusted to at least 9 prior to the addition of the peroxide; however, solutions of lower pH values are also suitable.

Suitable water-soluble carbonate compounds which are well adapted to precipitate the rare earth values and maintain the uranium and thorium values contained in the nitric acid solutions in solution are potassium carbonate, sodium carbonate, sodium bicarbonate and ammonium carbonate and mixtures thereof; sodium and ammonium carbonates yielded the best results. After addition of the carbonate the mixture is preferably digested, e. g. by boiling for ½ hour; the resultant precipitate is then filtered and the filtrate therefrom cooled to about 10° C.

To this filtrate, according to the invention, there is then added hydrogen peroxide in sufficient excess to precipitate the thorium and also any rare earth values that had not been precipitated by the carbonate. The precipitate is filtered off; it contained 99.6% of the thorium and 98% of the rare earth values in one instance, while the filtrate contained approximately 90% of the uranium present prior to the peroxide precipitation. This filtrate may be treated by any known procedure for the recovery of uranium.

The present invention is principally concerned with the peroxide precipitation from the filtrate containing mainly the thorium and uranium values. Details of the process for treatment of said filtrate are more fully described in the following examples.

*Example I*

A 100-ml. portion of an aqueous solution containing 30% by volume of hydrogen peroxide was added to 1080 ml. of an aqueous solution prepared from monazite sand residue and containing 10% by weight of sodium carbonate, 3650 mg. thorium dioxide, 125 mg. $U_3O_8$, 302 mg. rare earth oxides, 63 mg. $P_2O_5$, 42 mg. $TiO_2$ and 21 mg. $Fe_2O_3$. The peroxide precipitated all the cations and the phosphate anion completely, but only 7% of the uranium present. The filtrate obtained after removal of the mixed precipitate was found to contain 93% $U_3O_8$ and less than 0.5% thorium oxide. This example shows that a good uranium separation is possible by the process of this invention.

*Example II*

Two hundred and fifty ml. of a nitric acid solution of sodium hydroxide-treated monazite sand were neutralized to a pH of 6.3 with ammonium hydroxide whereby a precipitate formed. The precipitate was filtered off. The filtrate was analyzed and found to contain: uranium, negligible amounts; thorium oxide, less than 0.3%; rare earth oxides, 87%; $P_2O_5$, 0%; $TiO_2$, 0%; $Fe_2O_3$, 0%. The precipitate was found to contain essentially all of the uranium, >99.7% thorium dioxide, 13% rare earth oxides, and 100% each of the $P_2O_5$, $TiO_2$, and $Fe_2O_3$ present.

The precipitate was dissolved in a mixture consisting of 20 ml. water and 5 ml. of 70% nitric acid, and the solution formed was slowly added to a solution of 100 ml. of water and 40 g. of sodium carbonate; the mixture was heated and continuously stirred during addition and for a digestion of about ½ hour. The solution was then filtered to remove a precipitate which had formed. This precipitate was washed with a solution of 50 ml. water and 5 g. of sodium carbonate. The washed precipitate was dissolved in $HNO_3$ and the solution analyzed; it contained 5% thorium dioxide, 18% $U_3O_8$, 91% of the rare earth oxides, 48% $P_2O_5$, 72% $TiO_2$ and 55% $Fe_2O_3$. The filtrate obtained after removal of this last-mentioned precipitate was found to contain 82% of the uranium oxide, 95% of the thorium oxide and only 9% of the rare earth oxides, also 52% of the $P_2O_5$, 28% $TiO_2$, and 45% $Fe_2O_3$.

To this filtrate was added 300 mg. of malonic acid, and the solution was then cooled to 10° C. While stirring the solution, 50 ml. of 30% hydrogen peroxide solution was added. The solution had a pH of 9.5 before addition of the peroxide, but the value had dropped to about 9 when all the hydrogen peroxide had been added. A precipitate formed. After digestion of this mixture for about ½ hour, it was filtered; the precipitate was washed with 50 ml. of water containing 5 ml. of 30% hydrogen peroxide and then dissolved in nitric acid. The dissolved precipitate was analyzed; it contained 10% of the $U_3O_8$, more than 99.6% of the thorium dioxide, more than 98% rare earth oxides, 26% $P_2O_5$, 61% $TiO_2$, and over 92% $Fe_2O_3$. The filtrate contained 90% of the $U_3O_8$, less than 0.4% thorium oxide, less than 2% rare earth oxides, 74% $P_2O_5$, 39% $TiO_2$, and less than 8% $Fe_2O_3$.

It was found that the iron can be almost quantitatively removed by precipitating it with ammonia prior to the addition of hydrogen peroxide. Neither the thorium values nor the uranium values contained in the carbonate solution are precipitated to a substantial degree by the ammonia.

In addition to the uranium recovery shown in the foregoing examples, it is well to note that the thorium and rare earths precipitated by the process of this invention can also be readily separated from the mixed precipitate. The precipitate is dissolved in an acid for this purpose and hydrogen peroxide is added to the solution. While the rare earth values remain dissolved in the acid, the thorium values are almost quantitatively precipitated. For this purpose strongly acid solutions having a pH range from 0.2 to 1.5 are advantageous.

The invention is not limited to the described embodiments, but it is susceptible to variations and changes. The scope of the instant invention is to be limited only by the accompanying claims.

What is claimed is:

1. A process for separation of uranium values from a mixture comprising values of uranium and of thorium, which comprises forming a carbonate solution of said values in which the carbonate is present in excess quantity and the pH value is 9.5, adding hydrogen peroxide to said solution whereby thorium values precipitate, and separating the precipitate from the aqueous solution containing uranium values.

2. A process of separating uranium values from a mixture containing uranium values and thorium values, which comprises forming an aqueous carbonate solution of said mixture in which the carbonate is present in excess quantity and which has a pH of 9.5, adding hydrogen peroxide in an amount excessive of the stoichiometric quantity necessary to precipitate thorium values from the carbonate solution, and separating the precipitate formed from the aqueous uranium-containing solution.

3. A process for treating a mixture of uranium values and thorium values, which comprises dissolving said mixture in mineral acid, adding sodium carbonate to the resultant solution in an excess quantity so as to obtain a pH value of 9.5, adding hydrogen peroxide to the carbonate solution whereby thorium values precipitate, and separating the thorium-containing precipitate from the uranium-containing solution.

4. A process of treating an aqueous solution of carbonate-complexed thorium and uranium values in which the ratio of thorium to uranium expressed as $ThO_2$: $U_3O_8$ is about 30, comprising adding hydrogen peroxide to the aqueous solution whereby the thorium values precipitate while uranium values remain in solution, and separating the precipitate from the solution.

References Cited in the file of this patent

Mellor: Comprehensive Treatise of Inorganic and Theoretical Chemistry, vol. 7, pp. 225, 248 and 249 (1927); pub. by Longmans, Green & Co., London.

Bachelet et al.: Bulletin de la Societe Chimique de France, Jan.-Feb. 1952, pp. 55–60.